(12) United States Patent
Nakajima et al.

(10) Patent No.: US 11,333,526 B2
(45) Date of Patent: May 17, 2022

(54) PHYSICAL QUANTITY DETECTION CIRCUIT, PHYSICAL QUANTITY SENSOR, ELECTRONIC DEVICE, VEHICLE, AND FAILURE DIAGNOSIS METHOD OF PHYSICAL QUANTITY SENSOR

(71) Applicants: Seiko Epson Corporation, Tokyo (JP); DENSO CORPORATION, Kariya (JP)

(72) Inventors: Kiminori Nakajima, Shiojiri (JP); Naoki Yoshida, Kariya (JP)

(73) Assignees: Seiko Epson Corporation; Denso Corporation

( * ) Notice: Subject to any disclaimer, the term of this patent is extended or adjusted under 35 U.S.C. 154(b) by 281 days.

(21) Appl. No.: 16/820,840

(22) Filed: Mar. 17, 2020

(65) Prior Publication Data
US 2020/0300660 A1  Sep. 24, 2020

(30) Foreign Application Priority Data
Mar. 18, 2019  (JP) .............................. JP2019-049607

(51) Int. Cl.
*G01C 25/00* (2006.01)
*G01C 23/00* (2006.01)

(52) U.S. Cl.
CPC ............. *G01C 25/00* (2013.01); *G01C 23/00* (2013.01)

(58) Field of Classification Search
CPC .................................................. G01C 25/00
See application file for complete search history.

(56) References Cited

U.S. PATENT DOCUMENTS

| 2012/0035824 A1* | 2/2012 | Sy ...................... G01R 31/3004 701/70 |
| 2014/0118174 A1 | 5/2014 | Arai et al. |
| 2018/0287625 A1* | 10/2018 | Murashima .......... G01R 31/316 |

FOREIGN PATENT DOCUMENTS

| JP | H08-056160 A | 2/1996 |
| JP | 2014-090362 A | 5/2014 |

* cited by examiner

*Primary Examiner* — Walter L Lindsay, Jr.
*Assistant Examiner* — Andrew V Do
(74) *Attorney, Agent, or Firm* — Harness, Dickey & Pierce, P.L.C.

(57) ABSTRACT

A physical quantity detection circuit includes a detection signal generation circuit that generates a detection signal based on an output signal of a physical quantity detection element, an analog/digital conversion circuit that converts the detection signal into a first digital signal during a first period and converts the first test signal into a second digital signal during a second period, a digital signal processing circuit that processes the first digital signal to generate a third digital signal during the first period and processes a second test signal to generate a fourth digital signal during the second period, and a failure diagnosis circuit that performs a failure diagnosis of the analog/digital conversion circuit based on the second digital signal and a failure diagnosis of the digital signal processing circuit based on the fourth digital signal during the second period.

11 Claims, 9 Drawing Sheets

FIG. 4

| CHANNEL NUMBER | SEL | INPUT SIGNAL OF ADC | PROCESSING TARGET SIGNAL OF DSP |
|---|---|---|---|
| 1 | 000 | GRO1(GRO1_P, GRO1_N) | ADO |
| 2 | 001 | GRO2(GRO2_P, GRO2_N) | |
| 3 | 010 | AXO(AXO_P, AXO_N) | |
| 4 | 011 | AYO(AYO_P, AYO_N) | |
| 5 | 100 | TSO(TSO_P, TSO_N) | |
| 6 | 101 | TST1(TST1_P, TST1_N) | TST2 |

FIG. 5

| | | | |
|---|---|---|---|
| ADC TEST | CHANNEL 6a | MAXIMUM VALUE OUTPUT TEST | TST1=VMAX |
| | CHANNEL 6b | MINIMUM VALUE OUTPUT TEST | TST1=VMIN |
| | CHANNEL 6c | MEDIAN VALUE OUTPUT TEST | TST1=V1 |
| DSP TEST | CHANNEL 6d | FILTER INPUT RISING EDGE TEST | TST2=DIH |
| | CHANNEL 6e | FILTER INPUT FALLING EDGE TEST | TST2=DIL |

PHYSICAL QUANTITY DETECTION CIRCUIT, PHYSICAL QUANTITY SENSOR, ELECTRONIC DEVICE, VEHICLE, AND FAILURE DIAGNOSIS METHOD OF PHYSICAL QUANTITY SENSOR

The present application is based on, and claims priority from JP Application Serial Number 2019-049607, filed Mar. 18, 2019, the disclosure of which is hereby incorporated by reference herein in its entirety.

BACKGROUND

1. Technical Field

The present disclosure relates to a physical quantity detection circuit, a physical quantity sensor, an electronic device, a vehicle, and a failure diagnosis method of the physical quantity sensor.

2. Related Art

Currently, in various systems and electronic apparatuses, a physical quantity sensor capable of detecting various physical quantities such as a gyro sensor that detects an angular velocity and an acceleration sensor that detects an acceleration, are widely used. Recently, in particular, in order to construct a highly reliable system, a physical quantity sensor that outputs physical quantity detection information as digital data with high noise resistance has been used. Generally, the physical quantity sensor includes a physical quantity detection element and a physical quantity detection circuit that generates an analog signal corresponding to a detected physical quantity, based on a signal output from the physical quantity detection element, converts the analog signal into a digital signal by using an A/D conversion circuit, and thereafter performs digital signal processing.

In JP-A-8-56160, an abnormality detection device of an AD converter is described which changes a voltage value of a test signal input to the AD converter, determines whether or not a normal output value of the AD converter previously stored corresponding to the voltage value of the test signal matches an actual output value of the AD converter, and regards the AD converter as abnormal when it is determined to be not matched.

In JP-A-2014-90362, an analog/digital converter is described which generates addition digital data and subtraction digital data obtained by adding and subtracting a predetermined value to a result of comparing an analog input voltage and an output voltage of a digital/analog conversion unit and determines whether or not failure occurs by using a result of comparing each output level obtained by converting the addition digital data and the subtraction digital data by using the digital/analog conversion unit with the analog input voltage.

However, according to a device described in JP-A-8-56160 and an analog/digital converter described in JP-A-2014-90362, although failure of the analog/digital conversion circuit can be diagnosed, if a subsequent circuit fails, even if the analog/digital conversion circuit is normal, normal data may not be output from the physical quantity detection circuit.

SUMMARY

An aspect of a physical quantity detection circuit according to the present disclosure includes a detection signal generation circuit that generates a detection signal corresponding to a physical quantity based on an output signal of a physical quantity detection element which detects the physical quantity; an analog/digital conversion circuit that converts the detection signal into a first digital signal during a first period of a plurality of periods which are sequentially repeated and converts a first test signal into a second digital signal during a second period of the plurality of periods; a digital signal processing circuit that processes the first digital signal to generate a third digital signal during the first period and processes a second test signal to generate a fourth digital signal during the second period; a first test signal generation circuit that generates the first test signal during the second period; a second test signal generation circuit that generates the second test signal during the second period; and a failure diagnosis circuit that performs a failure diagnosis of the analog/digital conversion circuit based on the second digital signal and a failure diagnosis of the digital signal processing circuit based on the fourth digital signal during the second period.

In the aspect of the physical quantity detection circuit, the first test signal may include an upper limit value test signal for setting a value of an output signal of the analog/digital conversion circuit to an upper limit value, and a lower limit value test signal for setting the value of the output signal of the analog/digital conversion circuit to a lower limit value, and the failure diagnosis circuit may diagnose that the analog/digital conversion circuit fails when a value of the second digital signal obtained by converting the upper limit value test signal by using the analog/digital conversion circuit does not match the upper limit value and may diagnose that the analog/digital conversion circuit fails when a value of the second digital signal obtained by converting the lower limit value test signal by using the analog/digital conversion circuit does not match the lower limit value.

In the aspect of the physical quantity detection circuit, the first test signal may include a median value test signal for setting the value of the output signal of the analog/digital conversion circuit to a value between the upper limit value and the lower limit value, and the failure diagnosis circuit may diagnose that the analog/digital conversion circuit fails when the value of the second digital signal obtained by converting the median value test signal by using the analog/digital conversion circuit is not included in a predetermined range between the upper limit value and the lower limit value.

In the aspect of the physical quantity detection circuit, the digital signal processing circuit may include a digital filter, the second test signal may include a digital filter test signal for testing the digital filter, and the failure diagnosis circuit may diagnose that the digital signal processing circuit fails when a value of the fourth digital signal does not match a reference value after a predetermined time after a value of the digital filter test signal is changed.

In the aspect of the physical quantity detection circuit, the reference value may be a value before a value of an output signal of the digital filter is saturated.

In the aspect of the physical quantity detection circuit, the digital filter test signal may change from a first value to a second value, hold the second value, and thereafter change from the second value to the first value.

In the aspect of the physical quantity detection circuit, the digital filter test signal may change from the first value to a third value, hold the third value, and thereafter change from the third value to the first value, and the first value may be a value between the second value and the third value.

An aspect of a physical quantity sensor according to the present disclosure includes the aspect of the physical quantity detection circuit and the physical quantity detection element.

An aspect of an electronic apparatus according to the present disclosure includes the aspect of the physical quantity sensor and a processing circuit that performs processing based on an output signal of the physical quantity sensor.

An aspect of a vehicle according to the present disclosure includes the aspect of the physical quantity sensor and a processing circuit that performs processing based on an output signal of the physical quantity sensor.

An aspect of a failure diagnosis method according to the present disclosure, is a failure diagnosis method of a physical quantity sensor including a physical quantity detection element that detects a physical quantity, a detection signal generation circuit that generates a detection signal corresponding to the physical quantity based on an output signal of the physical quantity detection element, an analog/digital conversion circuit that converts the detection signal into a first digital signal during a first period of a plurality of periods which are sequentially repeated, and a digital signal processing circuit that processes the first digital signal to generate a third digital signal during the first period, and including a first test signal generation step of generating a first test signal during a second period of the plurality of periods; a second test signal generation step of generating a second test signal during the second period; an analog/digital conversion step of converting the first test signal into a second digital signal by using the analog/digital conversion circuit during the second period; a digital signal processing step of processing the second test signal to generate a fourth digital signal by using the digital signal processing circuit during the second period; a first failure diagnosis step of performing a failure diagnosis of the analog/digital conversion circuit based on the second digital signal during the second period; and a second failure diagnosis step of performing a failure diagnosis of the digital signal processing circuit based on the fourth digital signal during the second period.

BRIEF DESCRIPTION OF THE DRAWINGS

FIG. 4 is a diagram illustrating an example of a channel configuration of time division processing by the analog/digital conversion circuit and the digital signal processing circuit.

FIG. 5 is a diagram illustrating a configuration example of a plurality of subchannels in which a sixth channel is subdivided.

DESCRIPTION OF EXEMPLARY EMBODIMENTS

Hereinafter, preferred embodiments of the present disclosure will be described in detail with reference to the drawings. The embodiments described below do not unduly limit the contents of the present disclosure described in the appended claims. Also, not all of the configurations described below are essential constituent requirements of the present disclosure.

Hereinafter, a physical quantity sensor that detects an angular velocity and acceleration as physical quantities will be described as an example.

1. Physical Quantity Sensor 1-1. Configuration of Physical Quantity Sensor

Figure 1:
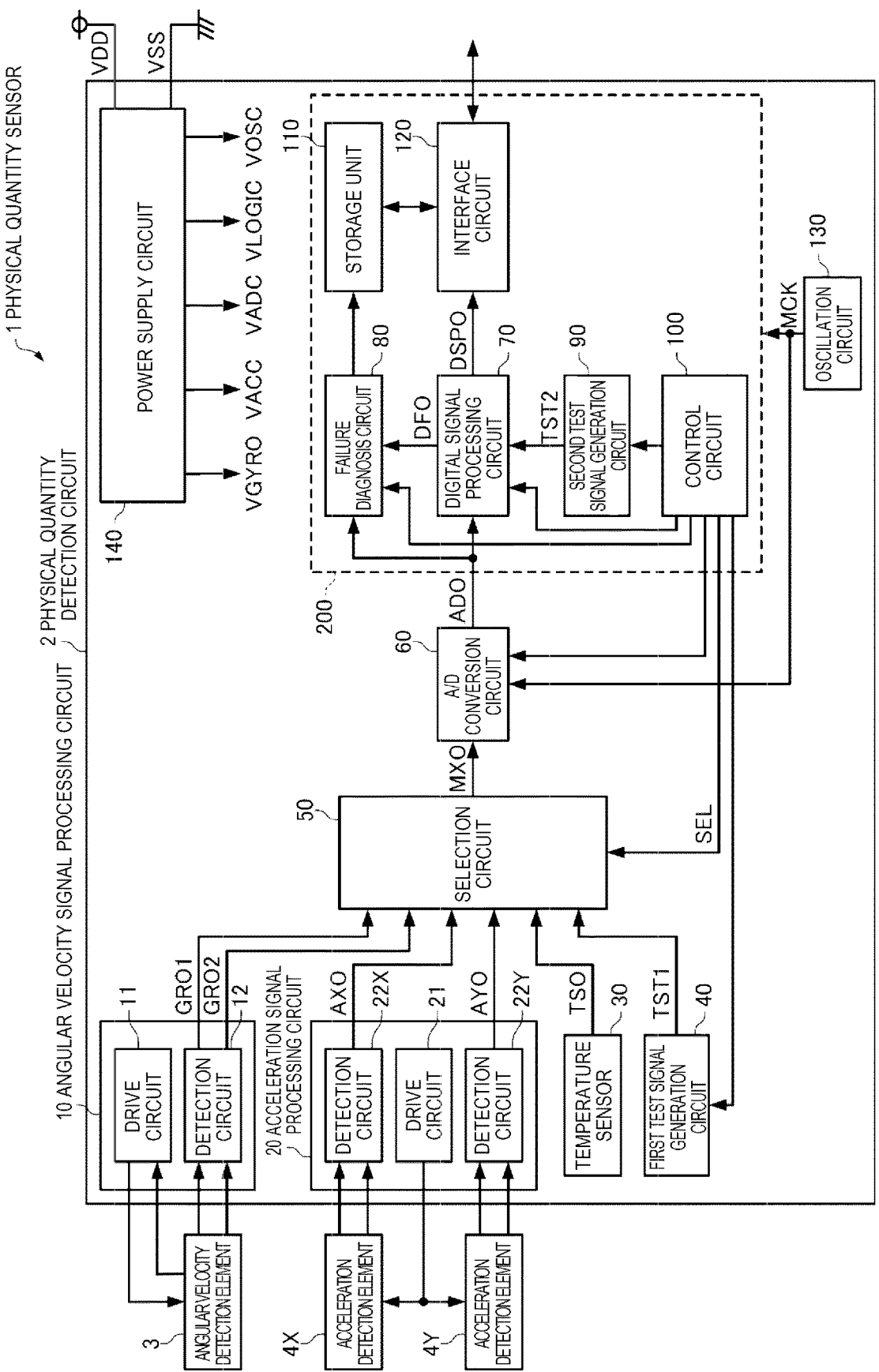
FIG. 1 is a functional block diagram of a physical quantity sensor according to an embodiment.

FIG. 1 is a functional block diagram of a physical quantity sensor of the present embodiment. The physical quantity sensor 1 of the present embodiment includes a physical quantity detection circuit 2, an angular velocity detection element 3, an acceleration detection element 4X, and an acceleration detection element 4Y.

The acceleration detection elements 4X and 4Y are physical quantity detection elements that detect acceleration as a physical quantity. The acceleration detection element 4X detects acceleration in a direction along an X axis, and the acceleration detection element 4Y detects acceleration in a direction along a Y axis orthogonal to the X axis. For example, each of the acceleration detection elements 4X and 4Y includes a capacitor having a drive electrode and a detection electrode (not illustrated) and may be an element in which a charge amount of the capacitor changes according to the acceleration and which outputs a signal corresponding to the charge amount. The acceleration detection elements 4X and 4Y may be, for example, micro electro mechanical systems (MEMS) elements.

The angular velocity detection element 3 is a physical quantity detection element that detects an angular velocity as a physical quantity. In the present embodiment, the angular velocity detection element 3 detects an angular velocity around a Z axis orthogonal to the X axis and the Y axis. For example, the angular velocity detection element 3 includes a vibrator element in which a drive electrode and a detection electrode (not illustrated) are arranged, and may be an element in which a magnitude of vibration of the vibrator element changes according to the angular velocity and which outputs a signal corresponding to the magnitude of the vibration. The angular velocity detection element 3 may be an element having, for example, a so-called double T-type quartz crystal vibrator element having two T-type drive vibration arms.

The physical quantity detection circuit 2 includes an angular velocity signal processing circuit 10, an acceleration signal processing circuit 20, a temperature sensor 30, a first test signal generation circuit 40, a selection circuit 50, an analog/digital conversion circuit 60, a digital signal processing circuit 70, a failure diagnosis circuit 80, a second test signal generation circuit 90, a control circuit 100, a storage unit 110, an interface circuit 120, an oscillation circuit 130, and a power supply circuit 140. The physical quantity detection circuit 2 may be realized by, for example, a one-chip integrated circuit (IC). The physical quantity detection circuit 2 may have a configuration in which a part of the elements is omitted or changed, or other elements are added.

The power supply circuit 140 generates a reference voltage VGYRO, a reference voltage VACC, a reference voltage VADC, a reference voltage VLOGIC, and a reference voltage VOSC, based on a power supply voltage VDD and a ground voltage VSS supplied from the outside of the physical quantity detection circuit 2. Further, the power supply circuit 140 generates various common voltages based on the power supply voltage VDD and the ground voltage VSS.

The oscillation circuit 130 operates by using the reference voltage VOSC as a power supply voltage and generates a clock signal MCK. For example, the oscillation circuit 130 may be configured as a ring oscillator or a CR oscillation circuit.

The angular velocity signal processing circuit 10 includes a drive circuit 11 and a detection circuit 12 and operates by using the reference voltage VGYRO as a power supply voltage.

The drive circuit 11 generates a drive signal for performing an excitation vibration of the angular velocity detection element 3 and supplies the drive signal to the angular velocity detection element 3. Further, the drive circuit 11 receives an oscillation current generated by the excitation vibration of the angular velocity detection element 3, and feedback-controls an amplitude level of the drive signal such that an amplitude of the oscillation current is held constantly. If an angular velocity around the Z axis is applied in a state of the excitation vibration, the angular velocity detection element 3 detects the angular velocity and outputs a signal corresponding to the angular velocity. In the present embodiment, the signal output from the angular velocity detection element 3 is a differential signal.

The detection circuit 12 is a detection signal generation circuit that generates a detection signal corresponding to the angular velocity around the Z axis based on an output signal of the angular velocity detection element 3. Specifically, the detection circuit 12 detects an angular velocity component included in the signal output from the angular velocity detection element 3 and generates and outputs an angular velocity detection signal GRO1 having a voltage level corresponding to a magnitude of the angular velocity component. Further, the detection circuit 12 detects a vibration leakage component included in the signal output from the angular velocity detection element 3 and generates and outputs a vibration leakage signal GRO2 having a voltage level corresponding to a magnitude of the vibration leakage component. In the present embodiment, the angular velocity detection signal GRO1 and the vibration leakage signal GRO2 are differential signals, respectively.

The acceleration signal processing circuit 20 includes a drive circuit 21, a detection circuit 22X, and a detection circuit 22Y and operates by using the reference voltage VACC as a power supply voltage.

The drive circuit 21 generates a carrier wave signal and outputs the carrier wave signal to the acceleration detection elements 4X and 4Y to drive the acceleration detection elements 4X and 4Y. If acceleration in a direction along the X axis is applied in this state, the acceleration detection element 4X detects the acceleration and outputs a signal corresponding to the acceleration. Further, if acceleration in a direction along the Y axis is applied, the acceleration detection element 4Y detects the acceleration and outputs a signal corresponding to the acceleration. In the present embodiment, the signals output from the acceleration detection elements 4X and 4Y are differential signals.

The detection circuit 22X is a detection signal generation circuit that generates a detection signal corresponding to the acceleration in the direction along the X axis based on an output signal of the acceleration detection element 4X. Specifically, the detection circuit 22X detects an acceleration component included in a signal output from the acceleration detection element 4X, generates an X-axis acceleration detection signal AXO having a voltage level corresponding to a magnitude of the acceleration component, and outputs the X-axis acceleration detection signal AXO. In the present embodiment, the X-axis acceleration detection signal AXO is a differential signal.

The detection circuit 22Y is a detection signal generation circuit that generates a detection signal corresponding to the acceleration in the direction along the Y axis based on an output signal of the acceleration detection element 4Y. Specifically, the detection circuit 22Y detects an acceleration component included in a signal output from the acceleration detection element 4Y, generates a Y-axis acceleration detection signal AYO having a voltage level corresponding to a magnitude of the acceleration component, and outputs the Y-axis acceleration detection signal AYO. In the present embodiment, the Y-axis acceleration detection signal AYO is a differential signal.

The temperature sensor 30 detects a temperature and outputs a temperature detection signal TSO having a voltage level corresponding to the temperature. The temperature sensor 30 may be, for example, a circuit that uses temperature characteristics of a band gap reference circuit. In the present embodiment, the temperature detection signal TSO is a differential signal.

The first test signal generation circuit 40 generates and outputs a first test signal TST1 based on a control signal from the control circuit 100. As will be described below, the first test signal TST1 is used for failure diagnosis of the analog/digital conversion circuit 60. In the present embodiment, the first test signal TST1 is a differential signal.

The selection circuit 50 selects and outputs any one of the angular velocity detection signal GRO1, the vibration leakage signal GRO2, the X-axis acceleration detection signal AXO, the Y-axis acceleration detection signal AYO, the temperature detection signal TSO, and the first test signal TST1, based on the selection signal SEL from the control circuit 100. In the present embodiment, an output signal MXO of the selection circuit 50 is a differential signal.

The analog/digital conversion circuit 60 converts the output signal MXO of the selection circuit 50 into a digital signal ADO based on a control signal from the control circuit 100 and outputs the digital signal ADO.

The digital signal processing circuit 70, the failure diagnosis circuit 80, the second test signal generation circuit 90, the control circuit 100, the storage unit 110, and the interface circuit 120 configure a logic circuit 200. The logic circuit 200 operates according to a clock signal MCK by using the reference voltage VLOGIC as a power supply voltage.

The digital signal processing circuit 70 processes the digital signal ADO output from the analog/digital conversion circuit 60 based on the control signal from the control circuit 100. In the present embodiment, the digital signal processing circuit 70 outputs a digital signal DFO obtained by digitally filtering the digital signal ADO. Further, the digital signal processing circuit 70 outputs a digital signal DSPO obtained by correcting and arithmetically processing the digital signal DFO. In the present embodiment, the digital signal processing circuit 70 outputs the digital signal DFO obtained by digitally filtering the second test signal TST2 during a predetermined period in place of the digital signal ADO.

The failure diagnosis circuit 80 performs a failure diagnosis of the analog/digital conversion circuit 60 and a failure diagnosis of the digital signal processing circuit 70 during a predetermined period based on the control signal from the control circuit 100. Specifically, the failure diagnosis circuit 80 performs the failure diagnosis of the analog/digital conversion circuit 60 based on the digital signal ADO output from the analog/digital conversion circuit 60 during the predetermined period, and performs the failure diagnosis of the digital signal processing circuit 70 based on the digital signal DFO output from the digital signal processing circuit during the predetermined period. Then, the failure diagnosis circuit 80 generates flag information indicating whether or not the analog/digital conversion circuit 60 fail and flag information indicating whether or not the digital signal processing circuit 70 fails, based on the failure diagnosis and stores the information in the storage unit 110.

The second test signal generation circuit 90 generates and outputs the second test signal TST2 based on the control signal from the control circuit 100. As will be described below, the second test signal TST2 is used for a failure diagnosis of the digital signal processing circuit 70.

The control circuit 100 generates and outputs the selection signal SEL and various control signals for controlling operations of the first test signal generation circuit 40, the analog/digital conversion circuit 60, the digital signal processing circuit 70, the failure diagnosis circuit 80, the second test signal generation circuit 90, and the like.

The storage unit 110 includes a nonvolatile memory (not illustrated), and the nonvolatile memory stores various types of trimming data for the angular velocity signal processing circuit 10, the acceleration signal processing circuit 20, and the like, coefficient data used for processing by the digital signal processing circuit 70, and the like. The nonvolatile memory may be configured as, for example, a metal oxide nitride oxide silicon (MONOS) type memory or an electrically erasable programmable read-only memory (EEPROM). Furthermore, the storage unit 110 may have a configuration in which the storage unit includes a register (not illustrated), and when the physical quantity detection circuit 2 is power on, that is, when a voltage of a VDD terminal increases from 0 V to a desirable voltage, various types of data stored in the nonvolatile memory are transferred to and held in the register, and the various types of data held in the register are supplied to the respective circuits. Further, flag information generated by the failure diagnosis circuit 80 is stored in the register of the storage unit 110.

The interface circuit 120 performs processing of outputting the digital signal DSPO output from the digital signal processing circuit 70 according to a request from an external device. Further, the interface circuit 120 performs processing of reading and outputting data stored in a nonvolatile memory or a register of the storage unit 110, processing of writing data input from the external device to the nonvolatile memory or register of the storage unit 110, or the like according to the request from the external device of the physical quantity detection circuit 2. The interface circuit 120 may be, for example, an interface circuit of a serial peripheral interface (SPI) bus or an interface circuit of an inter-integrated circuit ($I^2C$) bus.

1-2. Configuration of Selection Circuit and Analog/Digital Conversion Circuit

Figure 2:
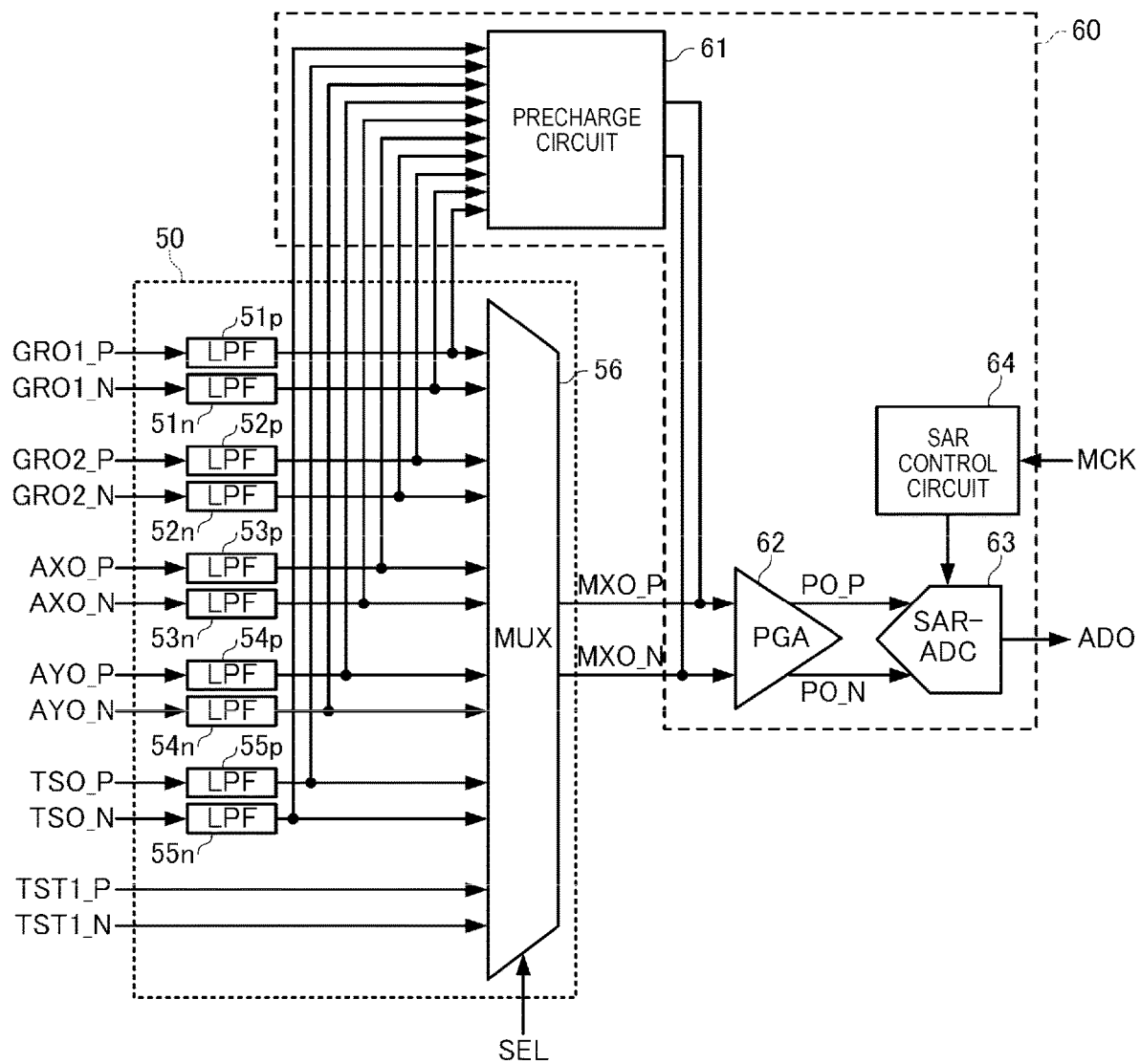
FIG. 2 is a diagram illustrating a configuration example of a selection circuit and an analog/digital conversion circuit.

FIG. 2 is a diagram illustrating a configuration example of the selection circuit 50 and the analog/digital conversion circuit 60. In the example of FIG. 2, the selection circuit 50 includes ten low pass filters 51p, 51n, 52p, 52n, 53p, 53n, 54p, 54n, 55p, and 55n and a multiplexer 56.

Differential signals GRO1_P and GRO1_N configuring the angular velocity detection signal GRO1 are low-pass-filtered by the low pass filters 51p and 51n, respectively, and input to the multiplexer 56.

Differential signals GRO2_P and GRO2_N configuring the vibration leakage signal GRO2 are low-pass-filtered by the low pass filters 52p and 52n, respectively, and input to the multiplexer 56.

Differential signals AXO_P and AXO_N configuring the X-axis acceleration detection signal AXO are low-pass-filtered by the low pass filters 53p and 53n, respectively and input to the multiplexer 56.

Differential signals AYO_P and AYO_N configuring the Y-axis acceleration detection signal AYO are low-pass-filtered by the low pass filters 54p and 54n, respectively, and input to the multiplexer 56.

Differential signals ISO_P and ISO_N configuring the temperature detection signal TSO are low-pass-filtered by the low pass filters 55p and 55n, respectively, and input to the multiplexer 56.

Differential signals TST1_P and TST1_N configuring the first test signal TST1 are input to the multiplexer 56 without being low-pass-filtered.

The multiplexer 56 selects any differential signal of the low-pass-filtered differential signals GRO1_P and GRO1_N, the low-pass-filtered differential signals GRO2_P and GRO2_N, the low-pass-filtered differential signals AXO_P and AXO_N, the low-pass-filtered differential signals AYO_P and AYO_N, the low-pass-filtered differential signals ISO_P and ISO_N, and the differential signals TST1_P and TST1_N according to the selection signal SEL, and outputs the differential signals MXO_P and MXO_N.

In the example of FIG. 2, the analog/digital conversion circuit 60 includes a precharge circuit 61, a programmable gain amplifier 62, a successive approximation register (SAR) type analog/digital converter 63, and a SAR control circuit 64.

The precharge circuit 61 charges an input node of the programmable gain amplifier 62 according to a control signal from the control circuit 100 before conversion processing performed by the successive approximation analog/digital converter 63 starts, thereby, assisting charging by the differential signals MXO_P and MXO_N.

The programmable gain amplifier 62 outputs differential signals PO_P and PO_N obtained by amplifying the differential signals MXO_P and MXO_N. A gain of the programmable gain amplifier 62 is variably set according to the type of differential signals selected as the differential signals MXO_P and MXO_N according to the control signal from the control circuit 100.

The successive approximation type analog/digital converter 63 converts a voltage difference between the differential signals PO_P and PO_N into a digital signal ADO with a full scale between +VADC and −VADC and outputs the digital signal ADO.

The SAR control circuit 64 operates according to the clock signal MCK and performs processing or the like of selecting a voltage serving as a reference for comparison according to timing of a successive approximation by the successive approximation type analog/digital converter 63 and the comparison result.

1-3. Configuration of Digital Signal Processing Circuit

Figure 3:
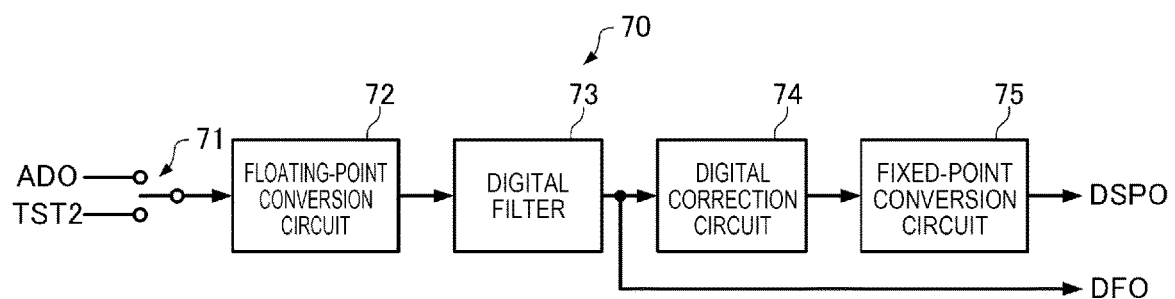
FIG. 3 is a diagram illustrating a configuration example of a digital signal processing circuit.

FIG. 3 is a diagram illustrating a configuration example of the digital signal processing circuit 70. In the example of FIG. 3, the digital signal processing circuit 70 includes a switch circuit 71, a floating-point conversion circuit 72, a digital filter 73, a digital correction circuit 74, and a fixed-point conversion circuit 75.

The switch circuit 71 selects one of the digital signal ADO output from the analog/digital conversion circuit 60 and the second test signal TST2 output from the second test signal generation circuit 90 according to the control signal from the control circuit 100 and outputs the selected signal.

The floating-point conversion circuit 72 converts the fixed-point type digital signal output from the switch circuit 71 into a floating-point type digital signal and outputs the floating-point type digital signal.

The digital filter 73 filters the digital signal output from the floating-point conversion circuit 72 according to the control signal from the control circuit 100 and outputs the digital signal DFO.

The digital correction circuit 74 performs various correction operations such as offset correction and gain correction for the digital signal DFO output from the digital filter 73 according to the control signal from the control circuit 100 and outputs the correction operation results.

The fixed-point conversion circuit 75 converts the floating-point type digital signal output from the digital correction circuit 74 into the fixed-point type digital signal DSPO and outputs the fixed-point type digital signal.

In the present embodiment, the digital signal processing circuit 70 includes general-purpose adder and multiplier, and the digital filter 73 and the digital correction circuit 74 are realized by using the adder and the multiplier together.

1-4. Channel Configuration for Time Division Processing

As described above, the analog/digital conversion circuit 60 converts the differential signal selected by the selection circuit 50 based on the selection signal SEL into the digital signal ADO and outputs the digital signal. That is, the analog/digital conversion circuit 60 processes the angular velocity detection signal GRO1, the vibration leakage signal GRO2, the X-axis acceleration detection signal AXO, the Y-axis acceleration detection signal AYO, the temperature detection signal TSO, and the first test signal TST1 in a time division manner to convert each into a digital signal.

Further, the digital signal processing circuit 70 processes the digital signal ADO or the second test signal TST2 generated by the time division processing of the analog/digital conversion circuit 60. That is, the digital signal processing circuit 70 processes the digital signal and the second test signal TST2, in a time division manner, corresponding to the angular velocity detection signal GRO1, the vibration leakage signal GRO2, the X-axis acceleration detection signal AXO, the Y-axis acceleration detection signal AYO, and the temperature detection signal TSO, respectively.

FIG. 4 is a diagram illustrating an example of a channel configuration for time division processing performed by the analog/digital conversion circuit 60 and the digital signal processing circuit 70.

As illustrated in FIG. 4, in a first channel, the 3-bit selection signal SEL is "000", the selection circuit 50 selects the angular velocity detection signal GRO1 as an input signal of the analog/digital conversion circuit 60, and the digital signal ADO is selected as a processing target signal of the digital signal processing circuit 70 by the switch circuit 71. Thus, the analog/digital conversion circuit 60 converts the angular velocity detection signal GRO1, specifically a voltage difference between the differential signals GRO1_P and GRO1_N into the digital signal ADO during a period of the first channel. Further, the digital signal processing circuit 70 processes the digital signal ADO to generate the digital signal DFO and the digital signal DSPO during the period of the first channel. Thus, in the first channel, processing for the angular velocity detection signal GRO1 is performed.

In a second channel following the first channel, the 3-bit selection signal SEL is "001", the selection circuit 50 selects the vibration leakage signal GRO2 as the input signal of the analog/digital conversion circuit 60, and the digital signal ADO is selected as the processing target signal of the digital signal processing circuit 70 by the switch circuit 71. Thus, the analog/digital conversion circuit 60 converts the vibration leakage signal GRO2, specifically a voltage difference between the differential signals GRO2_P and GRO2_N into the digital signal ADO during a period of the second channel. Further, the digital signal processing circuit 70 processes the digital signal ADO to generate the digital signal DFO and the digital signal DSPO during the period of the second channel. Thus, in the second channel, processing for the vibration leakage signal GRO2 is performed.

In a third channel following the second channel, the 3-bit selection signal SEL is "010", the selection circuit 50 selects the X-axis acceleration detection signal AXO as the input signal to the analog/digital conversion circuit 60, and the digital signal ADO is selected as the processing target signal of the digital signal processing circuit 70 by the switch circuit 71. Thus, the analog/digital conversion circuit 60 converts the X-axis acceleration detection signal AXO, specifically a voltage difference between the differential signals AXO_P and AXO_N into the digital signal ADO during a period of the third channel. Further, the digital signal processing circuit 70 processes the digital signal ADO to generate the digital signal DFO and the digital signal DSPO during the period of the third channel. Thus, in the third channel, processing for the X-axis acceleration detection signal AXO is performed.

In a fourth channel following the third channel, the 3-bit selection signal SEL is "011", the selection circuit 50 selects the Y-axis acceleration detection signal AYO as the input signal of the analog/digital conversion circuit 60, and the digital signal ADO is selected as the processing target signal of the digital signal processing circuit 70 by the switch circuit 71. Thus, the analog/digital conversion circuit 60 converts the Y-axis acceleration detection signal AYO, specifically a voltage difference between the differential signals AYO_P and AYO_N into the digital signal ADO during a period of the fourth channel. Further, the digital signal processing circuit 70 processes the digital signal ADO to generate the digital signal DFO and the digital signal DSPO during the period of the fourth channel. Thus, in the fourth channel, processing for the Y-axis acceleration detection signal AYO is performed.

In a fifth channel following the fourth channel, the 3-bit selection signal SEL is "100", the selection circuit 50 selects the temperature detection signal TSO as the input signal of the analog/digital conversion circuit 60, and the digital signal ADO is selected as the processing target signal of the digital signal processing circuit 70 by the switch circuit 71. Thus, the analog/digital conversion circuit 60 converts the temperature detection signal TSO, specifically, a voltage difference between the differential signals TSO_P and ISO_N into the digital signal ADO during a period of the fifth channel. The digital signal processing circuit 70 processes the digital signal ADO to generate the digital signal DFO and the digital signal DSPO during the period of the fifth channel. Thus, in the fifth channel, processing for the temperature detection signal TSO is performed.

In a sixth channel following the fifth channel, the first test signal generation circuit 40 generates the first test signal TST1, and the second test signal generation circuit 90 generates the second test signal TST2. Then, the 3-bit selection signal SEL is "101", the first test signal TST1 is selected as the input signal of the analog/digital conversion circuit 60, and the second test signal TST2 is selected as the processing target signal of the digital signal processing circuit 70 by the switch circuit 71. Thus, the analog/digital conversion circuit 60 converts the first test signal TST1, specifically, a voltage difference between the differential signals TST1_P and TST1_N into the digital signal ADO during a period of the sixth channel. Further, the digital signal processing circuit 70 processes the second test signal TST2 to generate the digital signal DFO and the digital signal DSPO during the period of the sixth channel. As such, in the sixth channel, digital conversion processing for the first test signal TST1 and digital signal processing for the second test signal TST2 are performed. The period of the sixth channel corresponds to a test period for a failure diagnosis of the analog/digital conversion circuit 60 and a failure diagnosis of the digital signal processing circuit 70.

After the sixth channel, the processing returns to the first channel. That is, a plurality of periods of the first channel to the sixth channel are sequentially repeated. In the digital signal processing circuit 70, a numerical order and a coefficient value of the digital filter 73, a type and a coefficient value of a correction calculation by the digital correction circuit 74, and the like are changed according to the processing target signal for each channel.

Among the periods of the plurality of channels which are sequentially repeated, for example, the period of any one of the first channel, the third channel, and the fourth channel corresponds to a "first period", and the period of the sixth channel corresponds to a "second period". Further, the digital signal ADO output from the analog/digital conversion circuit 60 in the period of any one of the first channel, the third channel, and the fourth channel corresponds to a "first digital signal", and the digital signal ADO output from the analog/digital conversion circuit 60 in the period of the sixth channel corresponds to a "second digital signal". Further, the digital signal DSPO output from the digital signal processing circuit 70 in the period of any one of the first channel, the third channel, and the fourth channel corresponds to a "third digital signal", and the digital signal DFO output from the digital signal processing circuit 70 in the period of the sixth channel corresponds to a "fourth digital signal".

1-5. Failure Diagnosis Processing

As described above, the period of the sixth channel is a test period for a failure diagnosis of the analog/digital conversion circuit 60 and a failure diagnosis of the digital signal processing circuit 70, and the sixth channel is subdivided into a plurality of subchannels for performs various tests, respectively. FIG. 5 is a diagram illustrating a configuration example of the plurality of subchannels obtained by subdividing the sixth channel.

Figure 6:
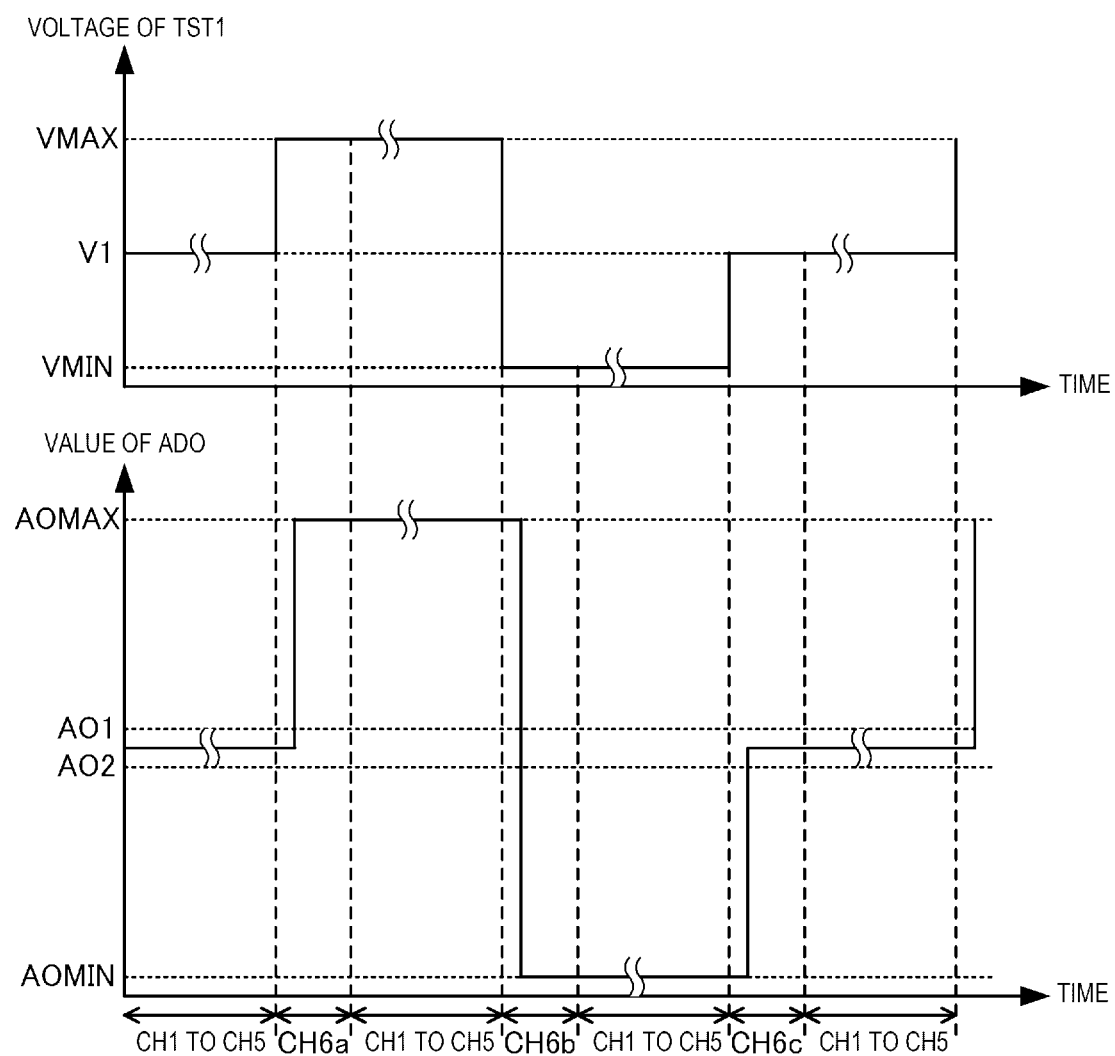
FIG. 6 is a diagram illustrating an example of a first test signal and a digital signal output from the analog/digital conversion circuit.

As illustrated in FIG. 5, a test for the failure diagnosis of the analog/digital conversion circuit 60 is performed in subchannels 6a, 6b, and 6c. FIG. 6 is a diagram illustrating an example of the first test signal TST1 and the digital signal ADO output from the analog/digital conversion circuit 60 in the subchannels 6a, 6b, and 6c. In FIG. 6, a horizontal axis represents time, and a vertical axis represents a voltage of the first test signal TST1 or a value of the digital signal ADO.

As illustrated in FIGS. 5 and 6, in the subchannel 6a, the first test signal generation circuit 40 sets a voltage value of the first test signal TST1, specifically a voltage difference between the differential signals TST1_P and TST1_N to a voltage value VMAX such that a voltage difference between the differential signals MXO_P and MXO_N input to the successive approximation type analog/digital converter 63 illustrated in FIG. 2 becomes +VADC, and it is tested whether or not a value of the digital signal ADO output from the analog/digital conversion circuit 60 becomes an upper limit value. For example, a gain of the programmable gain amplifier 62 illustrated in FIG. 2 may be set to 1, and the differential signals TST1_P and TST1_N may be set to the reference voltage VADC and the ground voltage VSS. Then, for example, when the analog/digital conversion circuit 60 outputs a 14-bit digital signal ADO, it is tested whether or not the value of the digital signal ADO is "01111111111111", that is, a decimal number+8191. As such, the first test signal TST1 in the subchannel 6a is an upper limit value test signal for setting a value of an output signal of the analog/digital conversion circuit 60 to the upper limit value.

Then, the failure diagnosis circuit 80 diagnoses that the analog/digital conversion circuit 60 fails when the value of the digital signal ADO obtained by converting the upper limit value test signal by using the analog/digital conversion circuit 60 does not match a upper limit value AOMAX, at predetermined timing of the subchannel 6a, for example, immediately before the subchannel 6a ends.

As illustrated in FIGS. 5 and 6, in the subchannel 6b, the first test signal generation circuit 40 sets the voltage value of the first test signal TST1, specifically the voltage difference between the differential signals TST1_P and TST1_N to a voltage value VMIN such that the voltage difference between the differential signals MXO_P and MXO_N input to the successive approximation type analog/digital converter 63 illustrated in FIG. 2 becomes −VADC, and it is tested whether or not the value of the digital signal ADO output from the analog/digital conversion circuit 60 becomes a lower limit value. For example, the gain of the programmable gain amplifier 62 illustrated in FIG. 2 may be set to 1, and the differential signals TST1_P and TST1_N may be set to the ground voltage VSS and the reference voltage VADC. Then, for example, when the analog/digital conversion circuit 60 outputs a 14-bit digital signal ADO, it is tested whether or not the value of the digital signal ADO is "10000000000000", that is, a decimal number −8192. As such, the first test signal TST1 in the subchannel 6b is a lower limit value test signal for setting the value of the output signal of the analog/digital conversion circuit 60 to the lower limit value.

Then, the failure diagnosis circuit 80 diagnoses that the analog/digital conversion circuit 60 fails when the value of the digital signal ADO obtained by converting the lower limit value test signal by using the analog/digital conversion circuit 60 does not match a lower limit value AOMIN, at predetermined timing of the subchannel 6b, for example, immediately before the subchannel 6b ends.

As illustrated in FIGS. 5 and 6, in the subchannel 6c, the first test signal generation circuit 40 sets the voltage value of the first test signal TST1, specifically the voltage difference between the differential signals TST1_P and TST1_N to a voltage value V1 such that the voltage difference between the differential signals MXO_P and MXO_N input to the successive approximation type analog/digital converter 63 illustrated in FIG. 2 is between +VADC and −VADC, and it is tested whether or not the value of the digital signal ADO output from the analog/digital conversion circuit 60 is included in predetermined range AO1 to AO2 between the upper limit value and the lower limit value. For example, the gain of the programmable gain amplifier 62 illustrated in FIG. 2 may be set to 1 and the voltage value V1 may be set to 0 V. As such, the first test signal TST1 in the subchannel 6c is a median value test signal for setting the value of the output signal of the analog/digital conversion circuit 60 to a value between the upper limit value and the lower limit value.

Then, the failure diagnosis circuit 80 diagnoses that the analog/digital conversion circuit 60 fails when the value of the digital signal ADO obtained by converting the median value test signal by using the analog/digital conversion circuit 60 is not included in the predetermined range AO1 to AO2 between the upper limit value AOMAX and the lower limit value AOMIN, at predetermined timing of the subchannel 6c, for example, immediately before the subchannel 6c ends.

Figure 7:
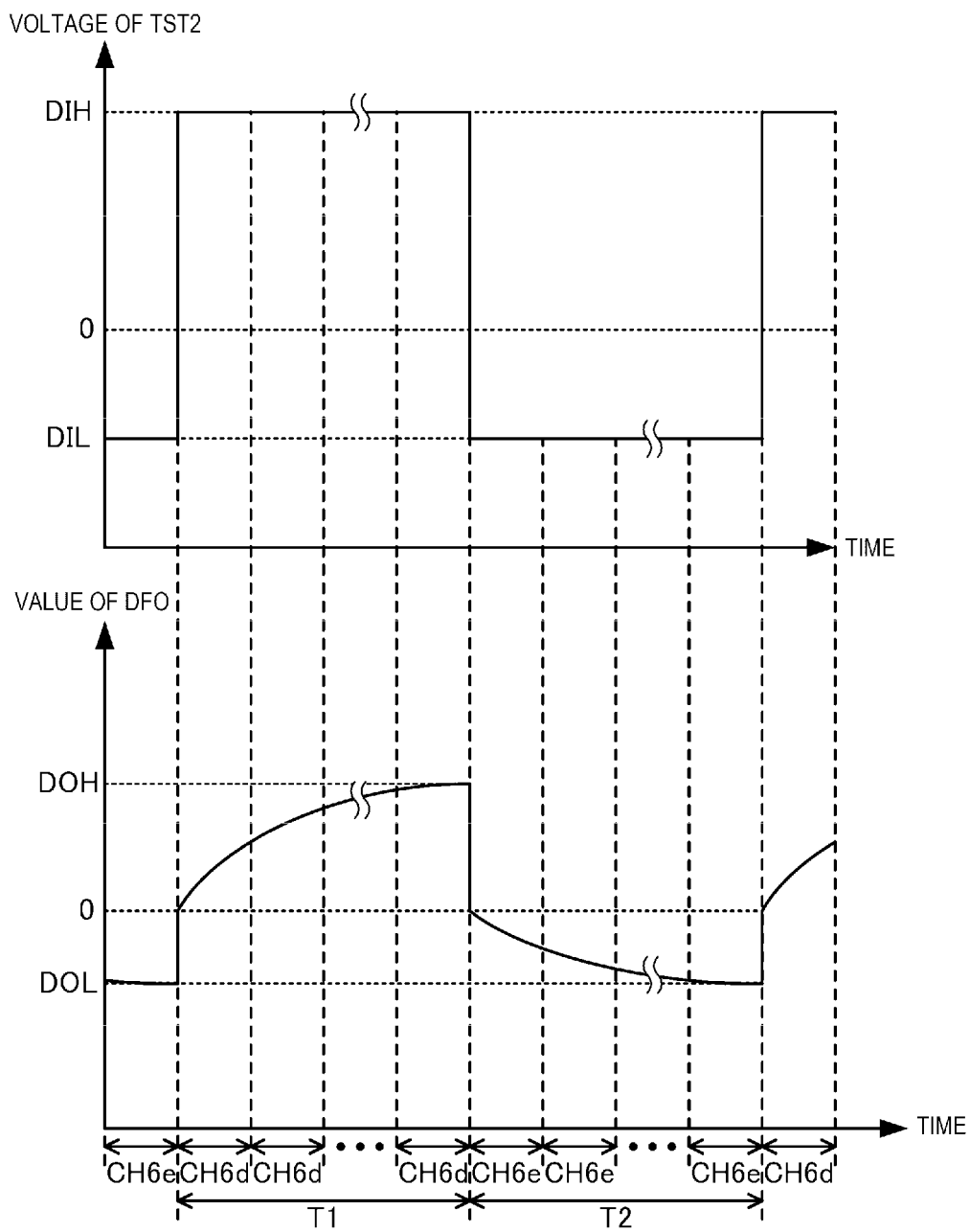
FIG. 7 is a diagram illustrating an example of a second test signal and a digital signal output from the digital signal processing circuit.

Further, as illustrated in FIG. 5, the test for failure diagnosis of the digital signal processing circuit 70 is performed in subchannels 6d and 6e. FIG. 7 is a diagram illustrating an example of the second test signal TST2 and the digital signal DFO output from the digital signal processing circuit 70 in the subchannels 6d and 6e. In FIG. 7, a horizontal axis represents time, and a vertical axis represents a value of the second test signal TST2 or a value of the digital signal DFO. The first channel to the fifth channel exist between two consecutive subchannels 6d, between the subchannel 6d and the subchannel 6e, between two consecutive subchannels 6e, and between the subchannel 6e and the subchannel 6d, respectively, but the first to fifth channels are not illustrated in FIG. 7.

As illustrated in FIGS. 5 and 7, in the subchannel 6d, the second test signal generation circuit 90 sets a value of the second test signal TST2 to a value DIH greater than 0, and a step response of a rising edge of an input signal to the digital filter 73 of the digital signal processing circuit 70 is tested. Further, in the subchannel 6e, the second test signal generation circuit 90 sets the value of the second test signal TST2 to a value DIL smaller than 0, and a step response of a falling edge of the input signal to the digital filter 73 is tested.

Specifically, as illustrated in FIG. 7, in the sixth channel, the subchannel 6d is continuously repeated a plurality of times over a period T1, and when the first subchannel 6d of the period T1 starts, the digital filter 73 is reset, and a value of the second test signal TST2 changes from 0 to DIH. Then, the value of the second test signal TST2 is held in DIH in the subsequent subchannel 6d, and thereby, a value of the digital signal DFO output from the digital filter 73 increases during the period T1. Further, in the sixth channel, the subchannel 6e is continuously repeated a plurality of times over a period T2, and when the first subchannel 6e of the period T2 starts, the digital filter 73 is reset and the value of the second test signal TST2 changes from 0 to DIL. Then, the value of the second test signal TST2 is held in DIL in the subsequent subchannel 6e, and thereby, the value of the digital signal DFO output from the digital filter 73 decreases during the period T2. The number of consecutive subchannels 6d and the number of consecutive subchannels 6e may be the same or different.

As such, the second test signal TST2 of the subchannels 6d and 6e is a digital filter test signal for testing the digital filter 73. Specifically, as illustrated in FIG. 7, the second test signal TST2 as a digital filter test signal changes from 0 to DIH which is a value between DIH and DIL, holds DIH, and thereafter, changes from DIH to 0 during the period T1. Further, the digital filter test signal changes from 0 to DIL, holds DIL, and thereafter, changes from DIL to 0 during the period T2. The periods T1 and T2 are alternately repeated.

In the example of FIG. 7, "0" which is the value of the second test signal TST2 corresponds to a "first value", one of DIH and DIL corresponds to a "second value", and the other one of DIH and DIL corresponds to a "third value".

Then, the failure diagnosis circuit 80 diagnoses the digital signal processing circuit 70 fails when a value of the digital signal DFO after a predetermined time does not match a reference value while a value of the digital filter test signal changes. Specifically, the failure diagnosis circuit 80 diagnoses that the digital signal processing circuit 70 fails when the value of the digital signal DFO does not match the reference value DOH at a predetermined timing of the subchannel 6d, for example, immediately before the last subchannel 6d of the period T1 ends. Further, the failure diagnosis circuit 80 diagnoses that the digital signal processing circuit 70 fails when the value of the digital signal DFO does not match the reference value DOL at a predetermined timing of the subchannel 6e, for example, immediately before the last subchannel 6e of the period T2 ends.

The reference values DOH and DOL is a value before a value of an output signal of the digital filter 73 is saturated. In other words, each of the period T1 and T2 ends before the value of the output signal of the digital filter 73 is saturated. Thereby, it is also possible to detect a failure in which the output signal of the digital filter 73 is fixed to a saturation value.

As described above, since a numerical order and a coefficient value of the digital filter 73 change for each channel, for example, the numerical order and the coefficient value of the digital filter 73 may be set so as to be the same as the number and a coefficient value of the digital filter 73 of the first channel in the subchannel 6d and may be set so as to be the same as the number and a coefficient value of the digital filter 73 of the third channel or the fourth channel in the subchannel 6e. Thereby, a failure detection rate of the digital signal processing circuit 70 is improved.

Figure 8:
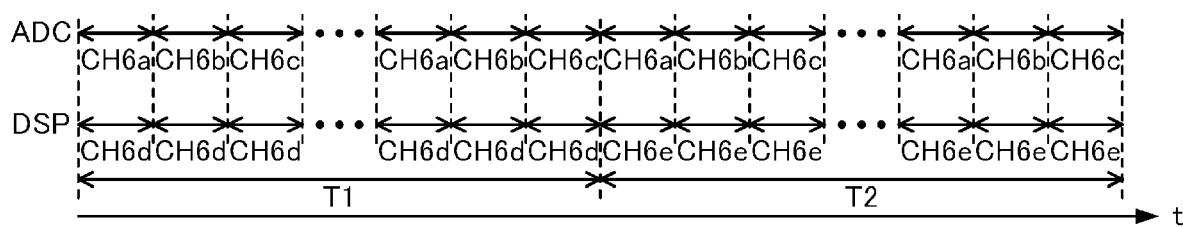
FIG. 8 is a diagram illustrating an example of a temporal relationship between subchannels.

As described above, in the sixth channel, the switch circuit 71 selects the second test signal TST2 as a processing target signal of the digital signal processing circuit 70. That is, the analog/digital conversion circuit 60 is disconnected from the digital signal processing circuit 70. Thus, a failure diagnosis processing of the analog/digital conversion circuit 60 in the subchannels 6a, 6b and 6c can be performed in parallel with failure diagnosis processing of the digital signal processing circuit 70 in the subchannels 6d and 6e. FIG. 8 is a diagram illustrating an example of a temporal relationship between the subchannels 6a, 6b, 6c, 6d, and 6e. In FIG. 8, a horizontal axis represents time. In the example of FIG. 8, the subchannel 6a, 6b and 6c are repeated during a period T1 in which the subchannel 6d is continuous a plurality of times, and likewise, the subchannels 6a, 6b, and 6c are repeated during a period T2 in which the subchannel 6e is continuous a plurality of times. As such, in the sixth channel, the failure diagnosis processing of the analog/digital conversion circuit 60 in the subchannels 6a, 6b, and 6c and the failure diagnosis processing of the digital signal processing circuit 70 in the subchannels 6d and 6e are performed in parallel with each other, and thereby, a frequency of a failure diagnosis of the analog/digital conversion circuit 60 and the digital signal processing circuit 70 is increased, and thus, reliability of the physical quantity sensor 1 is improved.

1-6. Failure Diagnosis Method

Figure 9:
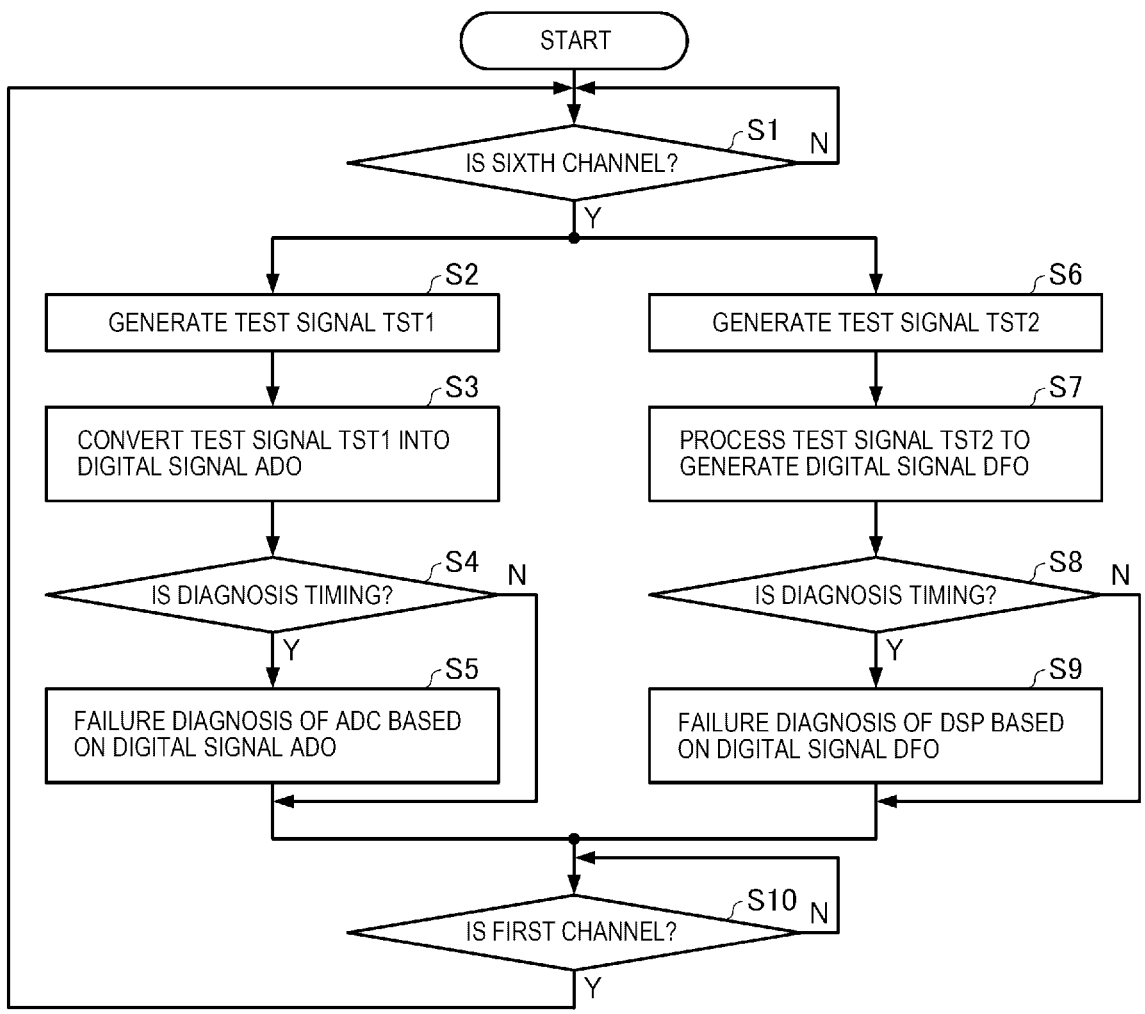
FIG. 9 is a flowchart illustrating an example of a sequence of a failure diagnosis method of the present embodiment.

FIG. 9 is a flow chart illustrating an example of a sequence of a failure diagnosis method of the physical quantity sensor 1 according to the present embodiment. In the flowchart of FIG. 9, processing of each step may be exchanged as appropriate.

As illustrated in FIG. 9, if timing reaches timing of the sixth channel (Y in step S1), the first test signal generation circuit 40 generates the first test signal TST1 (step S2). Specifically, the first test signal generation circuit 40 generates the first test signal TST1 described above for each of the subchannels 6a, 6b, and 6c.

Next, the analog/digital conversion circuit 60 converts the first test signal TST1 into the digital signal ADO (step S3).

Next, if the timing reaches diagnosis timing (Y in step S4), the failure diagnosis circuit 80 performs a failure diagnosis of the analog/digital conversion circuit 60 based on the digital signal ADO (step S5). Specifically, the failure diagnosis circuit 80 performs the above-described failure diagnosis for each of the subchannels 6a, 6b, and 6c. If the timing does not reach the diagnosis timing (N in step S4), the failure diagnosis circuit 80 does not perform the processing of step S5.

Further, the second test signal generation circuit 90 and the failure diagnosis circuit 80 perform processing of steps S6 to S9 in parallel with the processing of steps S2 to S5.

Specifically, first, the second test signal generation circuit 90 generates the second test signal TST2 (step S6). Specifically, the second test signal generation circuit 90 generates the above-described second test signal TST2 for each of the subchannels 6d and 6e.

Next, the digital signal processing circuit 70 processes the second test signal TST2 to generate the digital signal DFO (step S7).

Next, when the timing reaches the diagnosis timing (Y in step S8), the failure diagnosis circuit 80 performs a failure diagnosis of the digital signal processing circuit 70 based on the digital signal DFO (step S9). Specifically, the failure diagnosis circuit 80 performs the failure diagnosis described above for each of the subchannels 6d and 6e. If the timing does not reach the diagnosis timing (N in step S8), the failure diagnosis circuit 80 does not perform processing of step S9.

Then, after the first channel comes (Y in step S10), every time the sixth channel comes (Y in step S1), the processing of steps S2 to S5 and the processing of steps S6 to S9 are performed in parallel with each other.

Step S2 in FIG. 9 is an example of a "first test signal generation process". Step S3 in FIG. 9 is an example of an "analog/digital conversion process". Step S5 in FIG. 9 is an example of a "first failure diagnosis process". Step S6 in FIG. 9 is an example of a "second test signal generation process". Step S7 in FIG. 9 is an example of a "digital signal processing process". Step S9 in FIG. 9 is an example of a "second failure diagnosis process".

1-7. Effects

In the present embodiment, in periods of a first channel to a fifth channel among periods of the first channel to a sixth channel repeated sequentially, the analog/digital conversion circuit 60 converts the angular velocity detection signal GRO1, the vibration leakage signal GRO2, the X-axis acceleration detection signal AXO, the Y-axis acceleration detection signal AYO, and the temperature detection signal TSO into the digital signal ADO, and the digital signal processing circuit 70 processes the digital signal ADO to generate the digital signal DSPO. Further, in the period of the sixth channel, the analog/digital conversion circuit 60 converts the first test signal TST1 into the digital signal ADO, the digital signal processing circuit 70 processes the second test signal TST2 to generate the digital signal DFO, and the failure diagnosis circuit 80 performs a failure diagnosis of the analog/digital conversion circuit 60 based on the digital signal ADO and a failure diagnosis of the digital signal processing circuit 70 based on the digital signal DFO. That is, in the present embodiment, while the analog/digital conversion circuit 60 and the digital signal processing circuit 70 performs normal processing, the failure diagnosis circuit performs the failure analysis of the analog/digital conversion circuit 60 and the failure diagnosis of the digital signal processing circuit 70 based on the digital signal DFO. Thus, according to the present embodiment, for example, unlike the physical quantity sensor 1 of related art that performs only the failure diagnosis at specific timing such as at startup or at stop, the failure diagnosis of the analog/digital conversion circuit 60 and the failure diagnosis of the digital signal processing circuit 70 can be performed all the time, and thus, it is possible to realize the physical quantity detection circuit 2 and the physical quantity sensor 1 with a higher reliability than the related art.

Further, according to the present embodiment, in the sixth channel, since the failure diagnosis circuit 80 can perform the failure diagnosis of the analog/digital conversion circuit 60 and the failure diagnosis of the digital signal processing circuit 70 in parallel with each other, only one channel is required for the failure diagnosis, and thus, it is possible to lengthen each period of the first channel to the fifth channel. Thus, it is possible to secure a necessary processing time for the angular velocity detection signal GRO1, the vibration leakage signal GRO2, the X-axis acceleration detection signal AXO, the Y-axis acceleration detection signal AYO, and the temperature detection signal TSO.

Further, in the present embodiment, the first test signal TST1 includes an upper limit value test signal for setting a value of an output signal of the analog/digital conversion circuit 60 to the upper limit value AOMAX and a lower limit value test signal for setting the value of the output signal of the analog/digital conversion circuit to the lower limit value AOMIN. Then, the failure diagnosis circuit 80 diagnoses that the analog/digital conversion circuit 60 fails when a value of the digital signal ADO converted by the analog/digital conversion circuit 60 does not match the upper limit value AOMAX, and diagnoses that the analog/digital conversion circuit 60 fails when the value of the digital signal ADO converted by the analog/digital conversion circuit 60 does not match the lower limit value AOMIN. Thus, according to the present embodiment, it is possible to diagnose failure in which a range of the output value of the analog/digital conversion circuit 60 is abnormal. Further, according to the present embodiment, for example, as in the example described above, when the upper limit value AOMAX of the value of the digital signal ADO is "011111111111111" and the lower limit value AOMIN is "10000000000000", it is tested whether or not each bit of the digital signal ADO is inverted, and thus, it is possible to diagnose failure in which each bit is fixed to "0" or "1".

Further, in the present embodiment, the first test signal TST1 includes a median value test signal for setting the value of the output signal of the analog/digital conversion circuit 60 to a value between the upper limit value AOMAX and the lower limit value AOMIN. Then, the failure diagnosis circuit 80 diagnoses that the analog/digital conversion circuit 60 fails when the value of the digital signal ADO obtained by converting the median value test signal by using the analog/digital conversion circuit 60 is not included in the predetermined range AO1 to AO2. Thus, according to the present embodiment, it is possible to diagnose failure in which a value between the upper limit value and the lower limit value of the output signal of the analog/digital conversion circuit 60 is abnormal.

Further, in the present embodiment, the second test signal TST2 includes a digital filter test signal for testing the digital filter 73. Then, the failure diagnosis circuit 80 diagnoses that the digital signal processing circuit 70 fails, when the value of the digital signal DFO after a predetermined time after the value of the digital filter test signal changes does not match a reference value. For example, the digital filter test signal changes from 0 to DIH when the period T1 starts, holds DIH in the period T1, and thereafter, changes from DIH to 0. Further, the digital filter test signal changes from 0 to DIL when the period T2 starts, holds DIL in the period T2, and thereafter, changes from DIL to 0. Thus, according to the present embodiment, for example, unlike the physical quantity sensor 1 of related art in which presence or absence of the failure of the digital signal processing circuit 70 is inspected by a scan test or the like before shipment, a failure diagnosis of the digital signal processing circuit 70 using response characteristics of the digital filter 73 can be performed all the time.

Further, according to the present embodiment, since the digital signal processing circuit 70 realizes the digital filter 73 and the digital correction circuit 74 by using both general-purpose adder and multiplier, a failure diagnosis of the digital correction circuit 74 is also performed by the failure diagnosis of the digital filter 73, and thereby, reliability of the physical quantity detection circuit 2 and the physical quantity sensor 1 is improved.

1-8. Modification Example

For example, in the embodiments described above, various values such as DIH, DIL, DOH, DOL, AO1, and AO2, and various types of data used for a failure diagnosis of the periods T1, T2, and the like may be variably set in the storage unit 110.

Although the embodiment described above provides an example in which the numerical order and the coefficient value of the digital filter 73 are set to be the same as the numerical order and the coefficient value of the digital filter 73 in the first channel in the subchannel 6*d* and are set to be the same as the numerical order and the coefficient value of the digital filter 73 in the third channel and the fourth channel in the subchannel 6*e*, the present disclosure is not limited thereto. For example, the numerical order and the coefficient value of the digital filter 73 may be set to be the same as the numerical order and the coefficient value of the digital filter 73 in the first channel in the subchannels 6*d* and 6*e* or may be set to be the same as the numerical order and the coefficient value of the digital filter 73 in the third channel or the fourth channel in the subchannels 6*d* and 6*e*. Further, the number of subchannels for the failure diagnosis of the digital filter 73 is not limited to two. For example, four subchannels may be provided that is configured by two subchannels in which a numerical order and a coefficient value of the digital filter 73 are set to be the same as the numerical order and the coefficient value of the digital filter 73 in the first channel and a rising step response and a falling step response of an input signal are tested, and two subchannels in which the numerical order and the coefficient value of the digital filter 73 are set to be the same as the numerical order and the coefficient value of the digital filter 73 in the third channel or the fourth channel and a rising step response and a falling step response of the input signal are tested.

Further, in the embodiment described above, the analog/digital conversion circuit 60 receives a differential signal and converts the differential signal into the digital signal ADO but may input the single-end signal and convert the single-end signal into the digital signal ADO.

Further, in the embodiment described above, the physical quantity sensor 1 may include the angular velocity detection element 3, the acceleration detection element 4X, and the acceleration detection element 4Y but may be a sensor including only a part of the physical quantity detection elements. Further, the physical quantity sensor 1 may include a physical quantity detection element that detects a physical quantity such as an angular acceleration, speed, and force, for example, a physical quantity detection element that detects a physical quantity other than the angular velocity and acceleration.

Further, in the above embodiment, an example in which a vibrator element of the angular velocity detection element 3 is a double T type quartz crystal vibrator element is described, but the vibrator element of the physical quantity detection element that detects various physical quantities may be, for example, a tuning fork type or a comb teeth type or may be a sound piece shape such as a triangular prism, a quadrangular prism, or a cylindrical shape. Further, a piezoelectric material, for example, a piezoelectric single crystal such as lithium tantalate (LiTaO$_3$) or lithium niobate (LiNbO$_3$), a piezoelectric ceramic such as lead zirconate titanate (PZT), or the like may be used or a silicon semiconductor may be used as a material of a vibrator element of the physical quantity detection element instead of quartz crystal (SiO$_2$). Further, the vibrator element of the physical quantity detection element may have a structure in which, for example, a piezoelectric thin film such as zinc oxide (ZnO) or aluminum nitride (AlN) interposed between drive electrodes is disposed at a part of a surface of the silicon semiconductor.

Further, in the embodiment described above, the piezoelectric type angular velocity detection element 3 and the capacitive type acceleration detection elements 4X and 4Y are exemplified, but the physical quantity detection element that detects various physical quantities is not limited to the piezoelectric type or capacitive type element and may be an element of an electrodynamic type, an eddy current type, an optical type, a strain gauge type, or the like. Further, a detection type of the physical quantity detection element is not limited to the vibration type and may be, for example, an optical type, a rotary type, or a fluid type.

2. Electronic Apparatus

Figure 10:
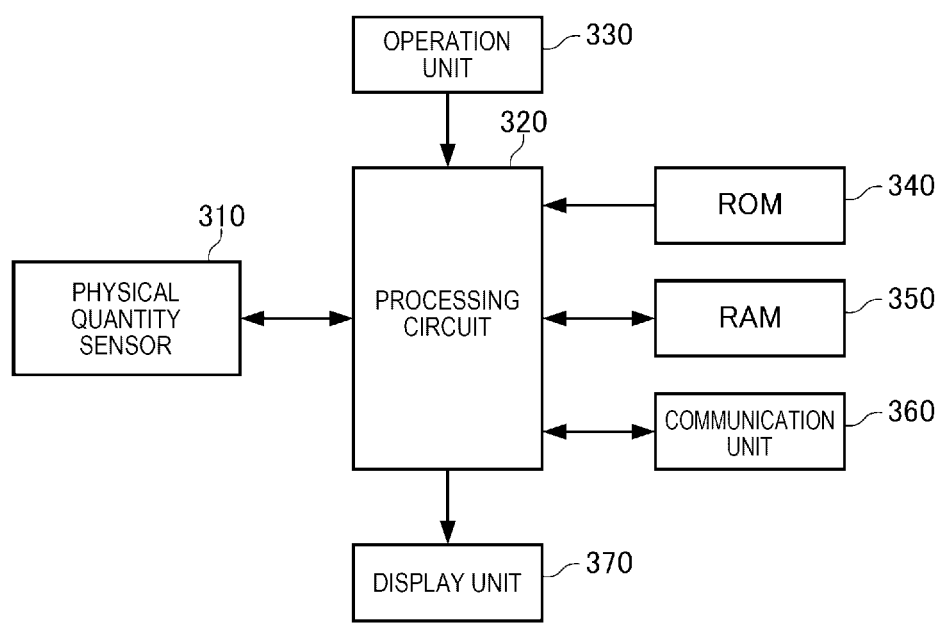
FIG. 10 is a functional block diagram illustrating an example of a configuration of an electronic apparatus according to the embodiment.

FIG. 10 is a functional block diagram illustrating a configuration example of an electronic apparatus of the present embodiment. As illustrated in FIG. 10, an electronic apparatus 300 of the present embodiment includes a physical quantity sensor 310, a processing circuit 320, an operation unit 330, a read only memory (ROM) 340, a random access memory (RAM) 350, a communication unit 360, and a display unit 370. The electronic apparatus of the present embodiment may have a configuration in which some of the components in FIG. 10 are omitted or changed, or other components are added.

The physical quantity sensor 310 outputs a detection result obtained by detecting the physical quantity to the processing circuit 320. For example, it is possible to apply the above-described physical quantity sensor 1 of the present embodiment as the physical quantity sensor 310.

The processing circuit 320 performs processing based on an output signal of the physical quantity sensor 310. Specifically, the processing circuit 320 communicates with the physical quantity sensor 310 according to a program stored in the ROM 340 or the like and performs various calculation processes and control processes by using output signals of the physical quantity sensor 310. In addition, the processing circuit 320 performs various processes according to operation signals from the operation unit 330, processing for controlling the communication unit 360 to perform data communication with an external device, processing for transmitting a display signal to display various types of information on the display unit 370, and the like.

The operation unit 330 is an input device configured with operation keys, button switches, and the like, and outputs an operation signal corresponding to an operation by a user to the processing circuit 320.

The ROM 340 stores programs, data, and the like for the processing circuit 320 to perform various calculation processes and control processes.

The RAM 350 is used as a work area of the processing circuit 320, and temporarily stores programs and data read from the ROM 340, data input from the operation unit 330, calculation results performed by the processing circuit 320 according to various programs, and the like.

The communication unit 360 performs various controls for establishing data communication between the processing circuit 320 and the external device.

The display unit 370 is a display device configured with a liquid crystal display (LCD) or the like and displays various types of information based on display signals input from the processing circuit 320. A touch panel that functions as the operation unit 330 may be provided in the display unit 370.

For example, as the physical quantity sensor 310, by applying the above-described physical quantity sensor 1 of the present embodiment, it is possible to realize, for example, a highly reliable electronic apparatus.

As such an electronic apparatus 300, various electronic apparatuses can be considered, for example, personal computers such as mobile type, laptop type, and tablet type, mobile terminals such as smartphones and mobile phones, digital cameras, ink jet discharge apparatus such as ink jet printers, storage area network equipment such as routers and switches, local area network equipment, vehicle terminal base station equipment, televisions, video cameras, video recorders, car navigation devices, real-time clock devices, pagers, electronic notebooks, electronic dictionaries, calculators, electronic game devices, game controller, word processor workstations, video phones, TV monitors for crime prevention, electronic binoculars, POS terminals, electronic thermometers, blood pressure monitors, blood glucose meters, electrocardiogram measuring devices, ultrasonic diagnostic devices, medical equipment such as electronic endoscopes, fish finders, various measuring devices, instruments such as vehicles, aircrafts, and ships, flight simulators, head-mounted displays, motion trace, motion tracking, motion controllers, pedestrian dead reckoning (PDR) devices, and the like.

Figure 11:
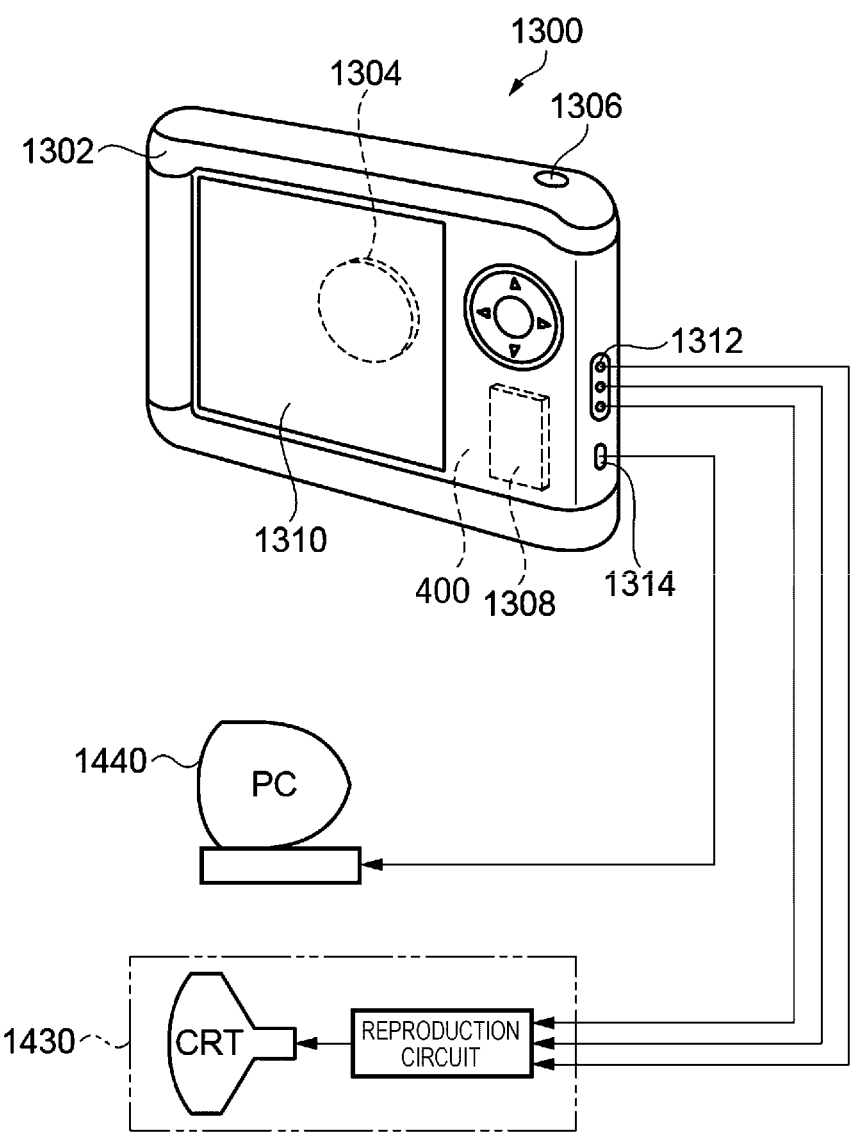
FIG. 11 is a perspective view schematically illustrating a digital camera which is an example of the electronic apparatus.

FIG. 11 is a perspective view illustrating schematically a digital camera 1300 that is an example of the electronic apparatus 300 of the present embodiment. FIG. 11 also illustrates a simple connection with an external device. Here, a normal camera sensitizes a silver halide photographic film with a light image of a subject, whereas the digital camera 1300 generates an image pickup signal by photoelectrically converting the light image of a subject with an image pickup element such as a charge coupled device (CCD).

A display unit 1310 is provided on the back surface of a case 1302 in the digital camera 1300, configured to perform display based on the image pickup signal from the CCD, and the display unit 1310 functions as a finder that displays an object as an electronic image. In addition, a light receiving unit 1304 including an optical lens and the CCD is provided on the front side of the case 1302. When a photographer confirms a subject image displayed on the display unit 1310 and presses a shutter button 1306, the image pickup signal of the CCD is transferred to and stored in a memory 1308 at that time. In addition, in the digital camera 1300, a video signal output terminal 1312 and an input/output terminal 1314 for data communication are provided on the side surface of the case 1302. Therefore, a television monitor 1430 is coupled with the video signal output terminal 1312 and a personal computer 1440 is coupled with the input/output terminal 1314 for data communication as necessary. Furthermore, the image pickup signal stored in the memory 1308 is output to a television monitor 1430 or a personal computer 1440 by a predetermined operation. For example, the digital camera 1300 includes the physical quantity sensor 310 that is the angular velocity sensor, and performs, for example, processes such as camera shake correction by using an output signal of the physical quantity sensor 310.

3. Vehicle

Figure 12:
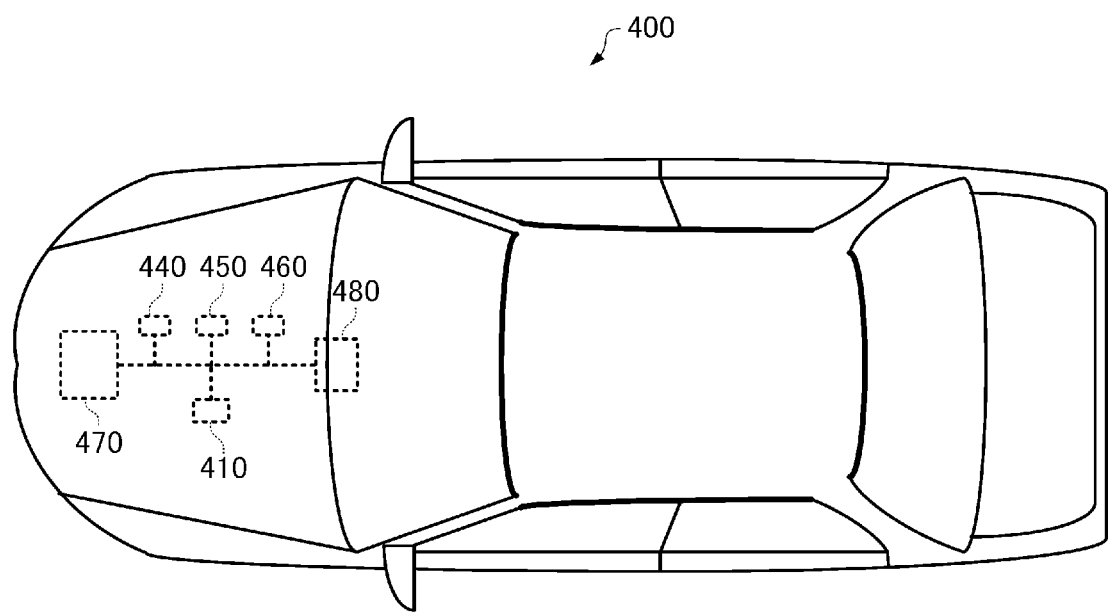
FIG. 12 is a diagram illustrating an example of a vehicle of the present embodiment.

FIG. 12 is a diagram illustrating an example of a vehicle of the present embodiment. A vehicle 400 illustrated in FIG. 12 includes a physical quantity sensor 410, processing circuits 440, 450, and 460, a battery 470, and a navigation device 480. The vehicle of the present embodiment may have a configuration in which some of the components in FIG. 12 are omitted or other components are added.

The physical quantity sensor 410, the processing circuits 440, 450, and 460, and the navigation device 480 are operated by a power supply voltage supplied from the battery 470.

The physical quantity sensor 410 outputs a detection result obtained by detecting the physical quantity to the processing circuits 440, 450, and 460.

The processing circuits 440, 450, and 460 perform processing based on an output signal of the physical quantity sensor 410. For example, each of the processing circuits 440, 450, and 460 performs various controls such as an attitude control system, a rollover prevention system, and a brake system by using an output signal of the physical quantity sensor 410.

The navigation device 480 displays the display position of the vehicle 400, time, and other various types of information on a display, based on output information of the built-in GPS receiver. In addition, the navigation device 480 identifies the position and orientation of the vehicle 400 based on an output signal of the physical quantity sensor 410 even when GPS radio waves do not reach, and continues to display necessary information.

For example, as the physical quantity sensor 410, by applying the physical quantity sensor 1 of the above-described embodiments, it is possible to realize, for example, a highly reliable vehicle.

As such a vehicle 400, various vehicles can be considered, and, for example, automobiles such as electric vehicles, aircrafts such as jets and helicopters, ships, rockets, artificial satellites, and the like can be included.

The above-described embodiments and modifications are merely examples, and the present disclosure is not limited to these. For example, each embodiment and each modification may be combined as appropriate.

The present disclosure includes configurations that are substantially the same as the configurations described in the embodiments (for example, configurations having the same functions, methods, and results, or configurations having the same objects and effects). In addition, the present disclosure includes a configuration in which a non-essential part of the configuration described in the embodiment is replaced. In addition, the present disclosure includes a configuration that achieves the same effect as the configuration described in the embodiment or a configuration that can achieve the same object. In addition, the present disclosure includes a configuration obtained by adding a known technique to the configuration described in the embodiment.

What is claimed is:

1. A physical quantity detection circuit comprising:
    a detection signal generation circuit that generates a detection signal corresponding to a physical quantity based on an output signal of a physical quantity detection element which detects the physical quantity;
    an analog/digital conversion circuit that converts the detection signal into a first digital signal during a first period of a plurality of periods which are sequentially repeated and converts a first test signal into a second digital signal during a second period of the plurality of periods;
    a digital signal processing circuit that processes the first digital signal to generate a third digital signal during the first period and processes a second test signal to generate a fourth digital signal during the second period;
    a first test signal generation circuit that generates the first test signal during the second period;
    a second test signal generation circuit that generates the second test signal during the second period; and
    a failure diagnosis circuit that performs a failure diagnosis of the analog/digital conversion circuit based on the second digital signal and a failure diagnosis of the digital signal processing circuit based on the fourth digital signal during the second period.

2. The physical quantity detection circuit according to claim 1, wherein
    the first test signal includes an upper limit value test signal for setting a value of an output signal of the analog/digital conversion circuit to an upper limit value, and a lower limit value test signal for setting the value of the output signal of the analog/digital conversion circuit to a lower limit value, and
    the failure diagnosis circuit diagnoses that the analog/digital conversion circuit fails when a value of the second digital signal obtained by converting the upper limit value test signal by using the analog/digital conversion circuit does not match the upper limit value and diagnoses that the analog/digital conversion circuit fails when a value of the second digital signal obtained by converting the lower limit value test signal by using the analog/digital conversion circuit does not match the lower limit value.

3. The physical quantity detection circuit according to claim 2, wherein
    the first test signal includes a median value test signal for setting the value of the output signal of the analog/digital conversion circuit to a value between the upper limit value and the lower limit value, and
    the failure diagnosis circuit diagnoses that the analog/digital conversion circuit fails when the value of the second digital signal obtained by converting the median value test signal by using the analog/digital conversion circuit is not included in a predetermined range between the upper limit value and the lower limit value.

4. The physical quantity detection circuit according to claim 1, wherein
    the digital signal processing circuit includes a digital filter,
    the second test signal includes a digital filter test signal for testing the digital filter, and
    the failure diagnosis circuit diagnoses that the digital signal processing circuit fails when a value of the fourth digital signal does not match a reference value after a predetermined time after a value of the digital filter test signal is changed.

5. The physical quantity detection circuit according to claim 4, wherein
    the reference value is a value before a value of an output signal of the digital filter is saturated.

6. The physical quantity detection circuit according to claim 4, wherein
    the digital filter test signal changes from a first value to a second value, holds the second value, and thereafter changes from the second value to the first value.

7. The physical quantity detection circuit according to claim 6, wherein
    the digital filter test signal changes from the first value to a third value, holds the third value, and thereafter changes from the third value to the first value, and
    the first value is a value between the second value and the third value.

8. A physical quantity sensor comprising:
    the physical quantity detection circuit according to claim 1; and
    the physical quantity detection element.

9. An electronic apparatus comprising:
    the physical quantity sensor according to claim 8; and
    a processing circuit that performs processing based on an output signal of the physical quantity sensor.

10. A vehicle comprising:
    the physical quantity sensor according to claim 8; and
    a processing circuit that performs processing based on an output signal of the physical quantity sensor.

11. A failure diagnosis method of a physical quantity sensor including a physical quantity detection element that detects a physical quantity, a detection signal generation circuit that generates a detection signal corresponding to the physical quantity based on an output signal of the physical quantity detection element, an analog/digital conversion circuit that converts the detection signal into a first digital signal during a first period of a plurality of periods which are sequentially repeated, and a digital signal processing circuit that processes the first digital signal to generate a third digital signal during the first period, the method comprising:
    a first test signal generation step of generating a first test signal during a second period of the plurality of periods;
    a second test signal generation step of generating a second test signal during the second period;
    an analog/digital conversion step of converting the first test signal into a second digital signal by using the analog/digital conversion circuit during the second period;
    a digital signal processing step of processing the second test signal to generate a fourth digital signal by using the digital signal processing circuit during the second period;

a first failure diagnosis step of performing a failure diagnosis of the analog/digital conversion circuit based on the second digital signal during the second period; and a second failure diagnosis step of performing a failure diagnosis of the digital signal processing circuit based on the fourth digital signal during the second period.

* * * * *